United States Patent [19]
Yorita et al.

[11] Patent Number: 5,162,906
[45] Date of Patent: Nov. 10, 1992

[54] APPARATUS FOR OBSERVING THE INTERIOR OF A HOT FURNACE

[75] Inventors: Eiichi Yorita; Takashi Yamamura; Shingo Nonaka, all of Okayama; Kazuo Kawano, Bizen, all of Japan

[73] Assignee: Shinagawa Refractories Co., Ltd., Tokyo, Japan

[21] Appl. No.: 445,862

[22] PCT Filed: Apr. 6, 1988

[86] PCT No.: PCT/JP88/00345
§ 371 Date: Nov. 28, 1989
§ 102(e) Date: Nov. 28, 1989

[87] PCT Pub. No.: WO89/09918
PCT Pub. Date: Oct. 19, 1989

[51] Int. Cl.⁵ .............................................. H04N 7/18
[52] U.S. Cl. ...................................... 358/100; 362/3; 362/373
[58] Field of Search ........................ 362/3-6, 362/373, 294, 218; 431/13, 23; 432/247, 248; 110/180, 193, 182.5; 358/100

[56] References Cited
U.S. PATENT DOCUMENTS

| | | | |
|---|---|---|---|
| 3,114,798 | 12/1963 | Jackson | 358/100 |
| 3,718,758 | 2/1973 | Ponghis et al. | 358/100 |
| 4,131,914 | 12/1978 | Bricmont | 358/100 |

FOREIGN PATENT DOCUMENTS

| | | |
|---|---|---|
| 35463 | 3/1979 | Japan . |
| 80445 | 5/1984 | Japan . |
| 114085 | 5/1986 | Japan . |
| 1246416 | 9/1971 | United Kingdom ............... 358/100 |

Primary Examiner—James C. Yeung
Attorney, Agent, or Firm—Armstrong & Kubovcik

[57] ABSTRACT

Disclosed is an apparatus for observing the interior of a hot furnace. The apparatus is equipped with a camera arranged in a case whose inner surface is cooled by means of cooling water and into whose inner space cooling air is blown, the apparatus comprising: a quartz-glass plate, a heat-ray-reflecting-glass plate, a heat-ray-absorbing-glass plate, and a heat-ray-transmitting mirror arranged in order of decreasing distance to the camera in an optical path through which a ray of light entering at the front surface of the case is led to the camera; and an illuminating lamp which is provided on the front surface of the case and whose luminance can be remote-controlled. With this construction, the temperature in the camera case can be kept at 50° C. or less, and damage to the camera due to the radiation heat entering through the glass window can be avoided. With this apparatus, the interior of a hot furnace can be observed over a temperature range of room temperature to 1200° C. while remote-controlling the luminance of the illuminating lamp.

7 Claims, 1 Drawing Sheet

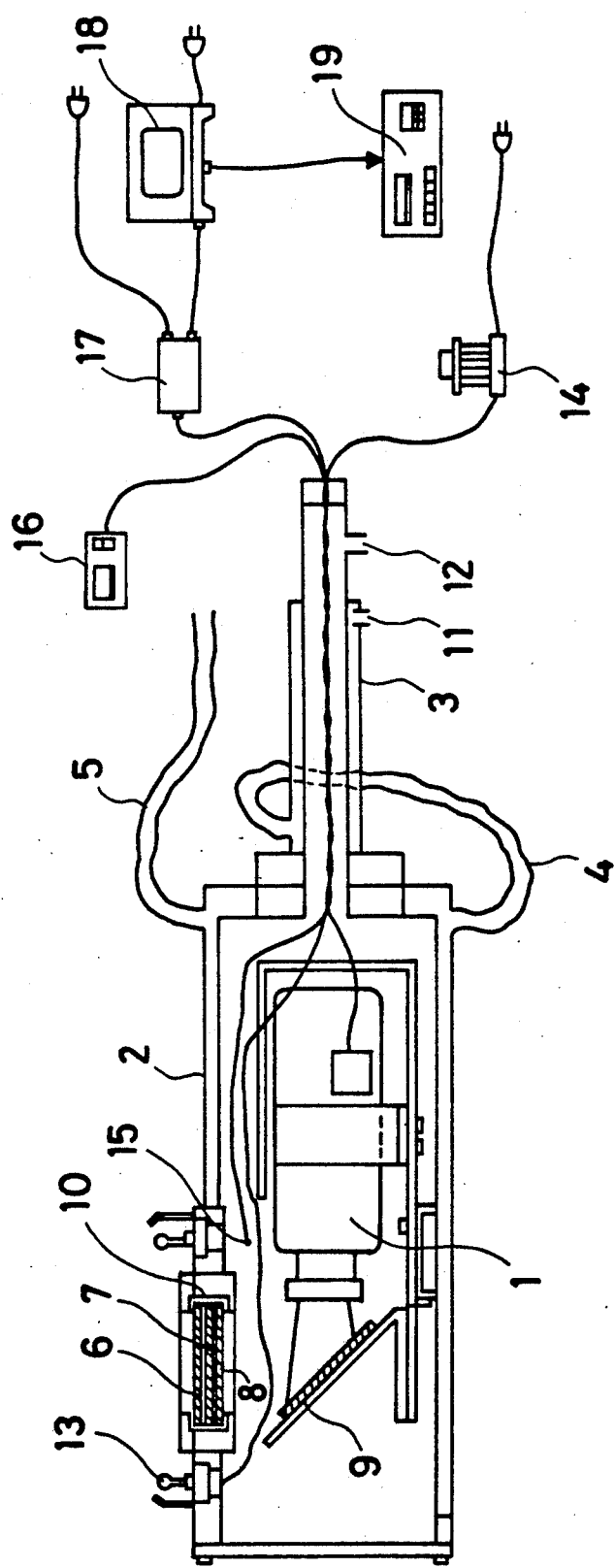

APPARATUS FOR OBSERVING THE INTERIOR OF A HOT FURNACE

BACKGROUND OF THE INVENTION

1. Field of the Invention

This invention relates to an apparatus for observing the refractories of a furnace or the like, such as a coke oven, blast furnace, metal mixer, melting pot, converter, or vacuum degasifier, with a view to examining them for wear or damage.

2. Description of the Related Art

Generally, the refractory lining of a furnace or the like, such as a coke furnace, blast furnace, metal mixer, melting pot, converter, or vacuum degasifier, is gradually worn away during operation. Hence the necessity for the refractories to be observed to monitor the wear or damage before they become so thin that they can no longer stand operation.

Conventionally, the degree of wear or damage the refractories of a hot furnace have been determined with an apparatus having a camera of a double-water-cooling structure in which cooling air is blown into the camera chamber.

However, in the conventional observing apparatus, equipped with a camera having a double-water-cooling structure in which cooling air is simply blown into the camera chamber, the interior of the camera can suffer damage due to the radiation entering the apparatus and heating it through the glass window thereof when used in a space at a high temperature of 900° C. or more. In addition, the automatic diaphragm of commercial cameras only provides a narrow permissible temperature range of 900° to 1200° C., so that observation cannot be performed to a satisfactory degree.

SUMMARY OF THE INVENTION

This invention has been made with a view to eliminating the above problems experienced with conventional apparatuses. It is accordingly the object of this invention to provide an apparatus for observing the interior of a hot furnace which employs a commercial TV camera capable of remote control of zooming and focusing and in which damage to the camera due to the radiation heat entering through the glass window is avoided, thereby making it possible to conduct observation in a temperature range of from room temperature to 1200° C.

To achieve this object, this invention provides an apparatus for observing the interior of a hot furnace. The apparatus is equipped with a camera arranged in a case whose inner surface is cooled by means of cooling water and into whose inner space cooling air is blown, the apparatus comprising: a quartz-glass plate, a heat-ray-reflecting-glass plate, a heat-ray-absorbing-glass plate, and a heat-ray-transmitting mirror arranged in order of decreasing distance to the camera in an optical path through which a ray of light entering at the front surface of the case is led to the camera; and an illuminating lamp which is provided on the front surface of the case and whose luminance can be remote-controlled.

As stated above, the hot-furnace-interior observing apparatus of this invention, which is equipped with a camera arranged in a case whose inner periphery is cooled by means of cooling water and into whose inner space cooling air is blown, comprises: a quartz-glass plate, a heat-ray-reflecting-glass plate, a heat-ray-absorbing-glass plate, and a heat-ray-transmitting mirror that are arranged in order of decreasing distance to the camera in the optical path through which the ray of light entering at the front surface of the case is led to the camera; and an illuminating lamp which is arranged on the front surface of the case and whose luminance can be remote-controlled. With this construction, the temperature in the case can be kept at 50° C. or less, damage to the camera due to the radiation heat entering through the glass window can be avoided, and the interior of a hot furnace can be observed over a temperature range of room temperature to 1200° C. while remote-controlling the luminance of the illuminating lamp.

BRIEF DESCRIPTION OF THE DRAWINGS

The attached drawing is a diagram showing an embodiment of a hot-furnace-interior observing apparatus in accordance with this invention.

DETAILED DESCRIPTION OF THE PREFERRED EMBODIMENT

An embodiment of this invention will now be described with reference to the attached drawing.

The embodiment of the hot-furnace-interior observing apparatus shown includes a video camera 1, a video-camera case 2, a camera-case supporting pipe 3, a water hose 4, a water discharge hose 5, a quartz-glass plate 6, a heat-ray-reflecting-glass plate 7, a heat-ray-absorbing-glass plate 8, a heat-ray-transmitting mirror 9, a cooling-air passing slit 10, a cooling-water inlet 11, a compressed-air inlet 12, an illuminating lamp 13, a luminance adjusting transformer 14, a temperature sensor 15, a temperature indicator 16, a remote-control box 17, a monitor-television set 18, and a recorder 19.

In the apparatus shown, cooling water enters at the cooling-water inlet 11 and cools the supporting pipe 3. It then passes through the water hose 4 and flows into the video-camera case 2, thereby cooling the case. The water is then discharged to the exterior through the water discharge hose 5.

Cooling air enters the apparatus at the compressed-air inlet 12 and cools the interior of the camera case 2 before being discharged to the exterior through the slit 10 provided around the glass system composed of the quartz-glass plate, the heat-ray-reflecting-glass plate, and the heat-ray-absorbing-glass plate. These glass plates are arranged in order from the exterior thus: the quartz-glass plate 6, the heat-ray-reflecting-glass plate 7, and the heat-ray-absorbing-glass plate 8. Provided between adjacent glass plates are clearances of about 2 mm, through which the cooling air is allowed to flow, thereby effectively cooling the glass plates.

A ray of light entering the apparatus first passes through the quartz-glass plate 6, and up to about 98% of the long-wave light-ray component having a wavelength ranging from 800 nm (nm=1/1000 μm) to 900 nm is reflected by the heat-ray-reflecting-glass plate 7. Of the portion of the ray of light which is allowed to reach the heat-ray-absorbing-glass plate 8, about 97% of the components thereof having a wavelength of 90 nm or more are either reflected or absorbed. As for the portion of light rays which is allowed to pass through the heat-ray-absorbing-glass plate 8, those components having a long wavelength are transmitted through the heat-ray-transmitting mirror 9, thus allowing only the visible rays to be reflected by the mirror to reach the video camera 1. The image thus observed is displayed on the monitor-television set 18 and is recorded by the recorder 19 as needed. The zooming and focusing of the video camera 1 can be remote-controlled at will by manipulating a remote-control operation box 17.

The temperature in the case is measured by the sensor 15 and is constantly monitored through the temperature indicator 16. In addition to the cooling effect of the above-mentioned cooling water and air, the intrusion of heat radiation through the window is prevented to the utmost, thereby making it possible to keep the temperature in the case at 50° C. or less, thus avoiding damage to the camera.

The built-in camera has an automatic-diaphragm function, the allowable temperature range of which is 900° C. to 1200° C. In view of this, the illuminating lamp 13 is provided, and its luminance is adjusted by remote-controlling the voltage supply, thereby making it possible to extend the lower-temperature side of the allowable temperature range down to room temperature.

Thus, this invention makes it possible to keep the temperature in the camera case at 50° C. or less, to avoid damage to the camera due to the radiation heat entering through the glass window, and to heighten the withstand temperature of the camera from the conventional 900° C. to 1200° C. Furthermore, by remote controlling the luminance of the illuminating lamp, the interior of a hot furnace can be observed over a temperature range of room temperature to 1200° C.

As described above, the apparatus of this invention employs a commercial camera the zooming and focusing of which can be remote-controlled. This apparatus is free from damage to the camera due to the radiation heat entering through the glass window and is suited for observing the interior of a hot furnace over a temperature range of room temperature to 1200° C.

What is claimed is:

1. An apparatus for observing a hot region, comprising:
    a camera;
    a case having an interior and enclosing said camera;
    cooling means for cooling said case;
    an optical system supported by said case including a plurality of plates aligned on an optical path facing the hot region;
    a first, outermost one of said plurality of plates comprising a quartz-glass plate;
    a second one of said plurality of plates spaced apart a predetermined distance from said quartz-glass plate, and comprising a heat-ray reflecting plate;
    a third one of said plurality of plates spaced apart a selected distance from said heat-ray-reflecting plate, and comprising a heat-ray-adsorbing-glass plate;
    air supply means for supplying cooling air to said optical system for cooling said plurality of plates via the interior of said case;
    a heat-ray-transmitting mirror for transmitting long wavelength radiation constituting heat radiation while reflecting visible radiation, said heat-ray-transmitting mirror receiving radiation from said third one of said plurality of plates and reflecting visible radiation to said camera.

2. An apparatus as claimed in claim 1, further comprising an illuminating means connected to said case, for illuminating said hot region.

3. An apparatus as claimed in claim 2, further comprising control means for remotely controlling said illuminating means.

4. An apparatus as claimed in claim 1, wherein said second one of said plurality of plates reflects about 98% of impinging light rays having wavelengths in a range of 800 nm to 900 nm.

5. An apparatus as claimed in claim 1, wherein said third one of said plurality of plates reflects or absorbs about 97% of impinging light rays having wavelengths of 900 nm or more.

6. An apparatus as claimed in claim 1, wherein said heat-ray-transmitting mirror comprises a plate mirror which does not long wavelength radiation constituting heat radiation, while reflecting visible radiation.

7. An apparatus as claimed in claim 1, further comprising a temperature sensor disposed inside said case, for sensing temperature within said case; and a temperature indicator connected to said temperature sensor, for indicating temperature sensed in said case by said sensor.

* * * * *